United States Patent
Kobayashi et al.

(10) Patent No.: US 7,798,082 B2
(45) Date of Patent: Sep. 21, 2010

(54) AIRBAG

(75) Inventors: Hiroyuki Kobayashi, Aichi-ken (JP);
Yoshinari Takei, Aichi-ken (JP);
Masakazu Asano, Aichi-ken (JP);
Susumu Ishikawa, Osaka (JP); Katsuji Takahashi, Tsuyama (JP)

(73) Assignees: Toyoda Gosei Co., Ltd., Aichi-pref. (JP); Gunze Limited, Kyoto (JP)

( * ) Notice: Subject to any disclaimer, the term of this patent is extended or adjusted under 35 U.S.C. 154(b) by 742 days.

(21) Appl. No.: 11/785,274

(22) Filed: Apr. 17, 2007

(65) Prior Publication Data

US 2007/0262575 A1 Nov. 15, 2007

(30) Foreign Application Priority Data

May 12, 2006 (JP) ............................ 2006-134029

(51) Int. Cl.
*D05B 13/00* (2006.01)
*D05B 1/26* (2006.01)
(52) U.S. Cl. ................ 112/475.08; 112/441; 280/728.1
(58) Field of Classification Search ............ 112/475.01, 112/475.17, 475.08, 302, 256, 441, 402, 112/406, 440; 280/728.1, 743.1, 730.2, 739; 428/364, 36.1, 64.1, 66.7
See application file for complete search history.

(56) References Cited

U.S. PATENT DOCUMENTS 6,283,507 B1* 9/2001 Kami et al. ............... 280/743.1
6,764,762 B2* 7/2004 Seemuth et al. ............. 428/364
2002/0020992 A1* 2/2002 Kanuma .................. 280/730.2
2004/0036262 A1* 2/2004 Kanuma et al. ............. 280/739
2007/0031621 A1   2/2007 Morimoto et al.
2007/0184733 A1* 8/2007 Manley ....................... 442/59

FOREIGN PATENT DOCUMENTS

| CN | 1703550 A | 11/2005 |
|---|---|---|
| JP | 54-93189 A | 7/1979 |
| JP | 63-227869 A | 9/1988 |
| JP | 03-51371 A | 3/1991 |
| JP | 2000-62563 A | 2/2000 |
| JP | 2000-199142 | 7/2000 |
| JP | 2002-283941 | 10/2002 |
| WO | WO 99/28164 | 6/1999 |

OTHER PUBLICATIONS

Jianguo Guo, et al. "Researches on Synthetic Fiber Spin Finish," *Journal of Zhongyuan Institute of Technology*, vol. 13 Supplement, Jul. 2002 (with English translation).
Shuyun et al., *Research on Manufacturing Technique of High-performance Nylon 66 Sewing Filaments*, China Science and Technology Information, Oct. 2005.
Japanese Information Offer Form provided by third party to the Japanese Patent Office on Mar. 15, 2010 in the corresponding Japanese patent application No. 2006-134029.

* cited by examiner

*Primary Examiner*—Ismael Izaguirre
(74) *Attorney, Agent, or Firm*—Posz Law Group, PLC

(57) ABSTRACT

An airbag is manufactured by sewing a base fabric woven with a first polar fiber by means of a sewing thread. The sewing thread is made up of a yarn formed from a second polar fiber such as nylon 66, and the yarn is subjected to a lubrication treatment using a lubricating agent that consists of a polar group-containing compound having an action to improve lubricity of the sewing thread or that contains mainly such a polar group-containing compound.

6 Claims, 2 Drawing Sheets sewn region    general region

AIRBAG

The present application claims priority from Japanese Patent Application No. 2006-134029 of Kobayashi et al., filed on May 12, 2006, the disclosure of which is hereby incorporated into the present application by reference.

BACKGROUND OF THE INVENTION

1. Field of the Invention

The present invention relates to an airbag formed by sewing up a base fabric woven with polar fiber, and to a sewing thread used in the sewing of the airbag. An airbag is a component incorporated into an airbag device installed in such vehicles as automobiles for protecting vehicle occupants.

In this specification, the invention will be described as being applied to an airbag device for a steering wheel. However, the invention can of course be applied to other types of airbag such as an airbag for a front passenger's seat, a side impact airbag and so on.

2. Description of Related Art

Conventionally, such an airbag used in an airbag device is produced by sewing up one or more (usually, more than one) base fabrics woven, usually plain-woven into a bag shape with polar fiber such as polyamide fiber exemplified by nylon 66 and/or the like, as shown in JP 2002-283941.

The sewing work of an airbag shown at 10 in FIG. 1 is performed on a high speed sewing machine (frequency of machine rotation 1000 to 4000 rpm ($min^{-1}$), usually 2000 to 3000 rpm), using a sewing thread 14 which is made up of the same kind of fiber as that used for base fabrics 12A, 12B, for example nylon 66. In the case of an airbag for a steering wheel, two pieces of circular base fabrics 12A, 12B are sewn up at their peripheral regions.

As in the case of sewing other thick fabrics, the sewing thread usually used for the above sewing work on a high speed sewing machine is the thread that has been subjected to a process of lubrication (dipping treatment) with a lubricant (usually, oleum) such as a silicone oil (a silicone-based oleum) from the viewpoint of preventing the thread breaking due to the heat of a needle.

On the other hand, recently, an improvement of air tightness of airbags upon airbag deployment has been increasingly demanded.

However, conventional airbags whose peripheral regions are sewn up with the sewing yarn treated by silicone oil has hardly fulfilled the demand.

SUMMARY OF THE INVENTION

In view of the foregoing, an object of the present invention is to provide an airbag having an improved air-tightness by suppressing a slippage in the weave in the vicinity of the sewn-up region of the airbag.

In the course of making strenuous efforts to solve the problems described above, the inventors proceeded on a presumption that the insufficient air-tightness of conventional airbags is caused because silicone oil attached to the sewing thread permeates into the base fabric, which reduces the slippage resistance or dislocation, loosening resistance of the weave of the fabric, thereby causing slippage and/or loosening of the weave when a stress is applied to the weave.

Then the inventors found that the weave slippage in the vicinity of the sewn-up region of the base fabric upon airbag deployment can be prevented by the use of non-silicone oils, which has less spontaneous spreading wettability against the base fabric, in particular polar group-containing compounds or lubricants (oleum) containing mainly polar group-containing compounds for the lubrication treatment of the sewing thread.

The airbag that inventors devised is an airbag manufactured by sewing a base fabric woven with a first polar fiber using a sewing thread. The sewing thread is made up of a yarn formed from a second polar fiber, and the yarn is treated by a lubricating agent that consists of a polar group-containing compound having an action to improve lubricity of the sewing thread or that contains mainly such a polar group-containing compound.

A polar group-containing compound having the action to improve lubricity does not usually exhibit a spreading wetting (high migrativity) where a contact angle θ can hardly be measured, as is the case with a silicone oil (non-polar oleum). The reason for this is presumed to be as follows.

A relationship between a critical interface tension (γc), a surface tension (γL) and a contact angle is expressed by the following equation, and the wetting property is believed to be as follows (see "Adhesion Handbook (second edition)" edited by The Adhesion Society of Japan, Nov. 10, 1980, page 27).

$$\cos \theta = 1 + b(\gamma c - \gamma L) \text{ (wherein b is a negative coefficient)}$$

Therefore, a liquid having a surface tension (γL) that is greater than γc reaches equilibrium on a solid while maintaining a constant contact angle, and a liquid having a surface tension (γL) that is less than γc spontaneously spreads over and wets the solid surface completely.

Incidentally, a silicone oil has a very low value of surface tension (γLV:γL), of a degree from 20 to 21.5 dyn/cm ("Plastic Material Course [9] Silicone Resin", The Nikkan Kogyo Shimbun, Ltd., p 166). On the other hand, the γc of polyhexamethyleneadipamide (nylon66) at 20° C. is 46 dyn/cm, and the γc of polyethylene terephthalate (PET: polyester) at 20° C. is 43 dyn/cm (see "Adhesion Handbook (second edition)", p 21, Table 2 and 7). In this context, a surface tension (γL) means a surface tension of a liquid which is in adsorption equilibrium with its vapor, and is also referred to as surface free energy that has accumulated over every unit area.

In view of the forgoing, a silicone oil (a silicone-based oleum) has an extremely high spreading wettability against a polar fiber such as nylon where a contact angle θ is unmeasurable, and it is presumed that a silicone oil attached to a sewing thread will be migrated to the side of a basic fabric that is also made up of polar fibers.

In contrast, in comparison with a non-polar liquid, a liquid consisting of one or more polar group-containing compound has a significantly greater surface tension (γL), which reduces the difference between γc and γL (γc−γL). Therefore, it is presumed that the spreading wettability (migrativity) will be reduced, too. In other words, it can also be argued that, coupled with the fact that, in comparison with a non-polar silicone oil, an SP value of a polar group-containing compound is nearer to that of a polar fiber for a sewing thread, wettability (adhesiveness) on a sewing thread becomes more satisfactory, and spreading (migration) into a basic fabric can be arrested.

In the aforementioned construction, the polar fibers for the basic fabric and the sewing thread are desirably a polyamide fiber, a polyester fiber or a vinylon fiber since such fibers are superior in terms of versatility and heat resistance, and will provide threads having a high strength.

In the aforementioned construction, it is desired that the polar group-containing compound is one or more kinds selected from the group consisting of ester series, higher fatty acid series, higher alcohol series, amine series, metal soap, oxidized wax and acid-modified wax.

PREFERRED EMBODIMENTS OF THE PRESENT INVENTION

Preferred embodiments of the present invention are now described below with reference to the accompanying drawings. However, the invention is not limited to the embodiments disclosed herein. All modifications within the appended claims and equivalents relative thereto are intended to be encompassed in the scope of the claims.

The embodied airbag is manufactured by sewing up one or more base fabric(s) woven with polar fiber (a first polar fiber) into a bag shape using a sewing thread.

Figure 1A:
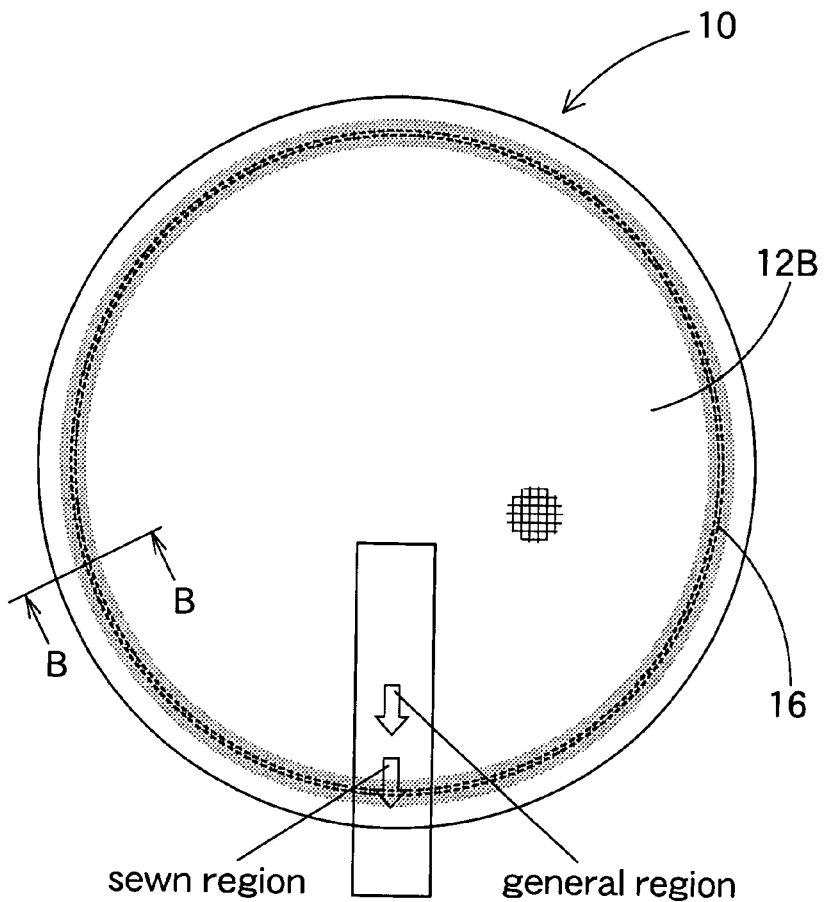
FIG. 1A is a plan view of an airbag used as a sample in the test example of the present invention.
Figure 1B:
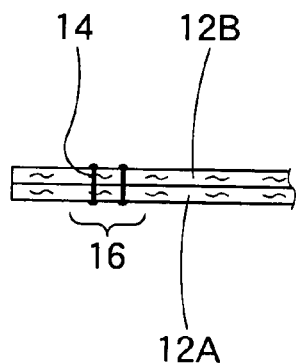
FIG. 1B is a partial sectional view of the airbag taken along line B-B of FIG. 1.

The present invention is applicable to any types of airbags such as airbags for a steering wheel, a front passenger's seat, or a side impact airbag. For example, in the case of an airbag for a steering wheel, two base fabrics each cut into a generally circular shape, i.e. a rear side basic fabric 12A provided with an air-inlet port (omitted in the drawing) and a front side basic fabric 12B, are sewn into a bag at peripheral regions by means of a sewing thread (FIG. 1).

An aliphatic polyamide fiber, particularly nylon 66, which is superior to other kinds of aliphatic polyamide in terms of heat resistance, is normally used for the polar fiber to weave the base fabrics. However, other aliphatic polyamides such as nylon 6 may also be used. Moreover, a polyester fiber such as PET or PBT, or a vinylon fiber may be used. In other words, the kind of the polar fiber should not be limited on condition that the fiber exerts a sufficient strength upon airbag deployment.

Although the weave style for the base fabrics is usually plain weave, the style should not be limited on condition that the weave exerts a sufficient strength upon airbag deployment as above.

The sewing thread used in the embodiment is made up of yarns of polar fiber (a second polar fiber) subjected to lubrication process using a lubricating agent that consists of a polar group-containing compound having a property to improve lubricity or that contains mainly such a polar group-containing compound.

A similar fiber to the above-described first polar fiber for the base fabrics may be used for the yarns for the sewing thread. That is, among the aliphatic polyamides, nylon 66 is desirable due to its versatility, and because it has a higher melting point than nylon 6 and thereby having high heat resistance property. The kind of the polar fiber should not be limited on condition that a predetermined strength and heat resistance is obtained. For example, other aliphatic polyamides such as nylon 6, aromatic amide, alicyclic polyamide may also be used. Moreover, a polyester fiber such as PET or PBT, and a vinylon fiber may be used as well.

The construction of the yarn may be either of a single yarn and a multiple wound yarn, and a raw material fiber for the yarn (single strand) may be either of a filament (including a twisted one), and a staple (short fiber). For example, a multiple wound yarn (700 to 2350 dtex) obtained by uniformly arranging plural (e.g. 2 to 4) non-twisted, or weakly twisted nylon filaments, and fixing them with paraffin may be used. In this context, fixation with paraffin is applied for purposes of enhancing convergence of the polyamide fiber (nylon) so as to prevent the thread from feazing in the sewing work, and for protecting the thread from friction heat resulting from high speed sewing.

In this context, a polar group-containing compound having an action to improve lubricity means one usually used for lubrication but silicone oil. It is exemplified by ester series, higher fatty acid series, higher alcohol series, amine series, metal soap, oxidized PE wax and acid-modified PE wax, as enumerated below.

These polar group-containing compounds except silicone oil may be used alone or in appropriate combination. Furthermore, it may be used together with a mineral oil or a polyethylene wax consisting of other non-polar or apolar compounds or the like. In this context, the mineral oil means a petroleum-based lubricant, including isoparaffin, cycloparaffin, and mononuclear aromatic compounds.

1) Ester series; Mono-, di-, tri- and tetra-esters of a monohydric alcohol or a polyhydric alcohol (e.g., glycerin, trimethylolpropane, pentaerythritol, and sorbitan) can be used to effect with saturated or unsaturated higher fatty acids of a carbon number of 8 to 18. More specifically, examples include oleums such as butyl stearate, oleic acid monoglyceride, hindered ester; trimethylolpropane trioleic acid ester, trimethylolpropane tricaprylic acid ester, trimethylolpropane tri-2-ethylhexanoic acid ester, pentaerythritol tetraoleic acid ester, complex esters, sulfur-containing esters, and neoic acid esters.

2) Higher fatty acid series: Saturated or unsaturated fatty acids of a carbon number of 12 to 20 can be suitably used. Specifically, examples may include oleic acid, palmitic acid, and stearic acid.

3) Higher alcohol series: Saturated or unsaturated monohydric alcohol of a carbon number of 10 to 20 can be suitably used. Specifically, examples may include lauryl alcohol and oleyl alcohol.

4) Higher alkylamine: Saturated or unsaturated amines of a carbon number of 12 to 20 can be suitably used. Specifically examples may include cetylamine.

5) Metal soap: Higher fatty acid metal esters of a carbon number of 10 to 20 can be suitably used. Specifically, examples may include iron oleate.

6) Oxidized PE wax means a PE wax (average molecular weight 500 to 10000) which, by means of air oxidation, has been made to contain a carbonyl group or a carboxyl group.

7) Acid-modified PE wax means a PE wax which has been acid-modified with an acid such as maleic acid.

Further, the compound is desirably liquid at normal temperature or oily agent from the viewpoint of handling property. However, it is thought that a solid agent having a melting point at approximately 100° C. may also be used since a needle temperature can rise up to as high as 200 to 250° C. If the melting point is higher than that, however, a boiling point will be accordingly high, and therefore, it will be hard to obtain the lubricating property and an action to suppress a rise of the temperature of the sewing needle due to heat of volatilization of the compound.

The treating (coating) method is usually a soaking treatment if the compound is liquid, but spraying, flow coating (curtain coating or shower coating) or roller coating (pressure contact coating) will also be appreciated. If the polar group-containing compound which is solid at normal temperature is desired to be used for the soaking treatment, the compound is heat-melted, or formulated into a solution or a dispersion (suspension or emulsion).

The amount of the compound attached to the sewing thread is an amount which exerts such a lubricating property that the tension of an upper thread and a lower thread will be a predetermined value or less (e.g. 200 to 500 g) when pulled out from a high speed sewing machine.

The sewing thread 14 prepared in the above manner is wound on a bobbin, and is mounted on a high speed automatic sewing machine (e.g. a sewing speed of 3000 rpm) or a high speed manual sewing machine (e.g. a sewing speed of 2000 rpm). The kind of sewing machine may be of either single-needle type or twin-needle type.

The high speed automatic sewing machine or the high speed manual sewing machine is used to sew up the peripheral regions 16 of circular base fabrics 12A, 12B. Then annular reinforcing cloths are laminated on and sewn to such openings as the air-inlet port or a vent port (not shown) formed in the rear side base fabric, and thereby forming the airbag 10.

The airbag 10 manufactured in such a fashion is, as is conventionally done, incorporated into an airbag device, and is installed into a vehicle.

In operation, when the airbag device is actuated, the weave slippage of the base fabrics hardly occur in the airbag 10 even over time, as will be described later, and which improves the air tightness or sealing property in the sewn region (joined region). Therefore, the demand for the improvement of air-tightness upon airbag deployment will be satisfied.

Examples (Test Examples) which were implemented in order to validate the effects of the present invention, together with a Comparative Example, will now be described below.

Samples for each Example and Comparative Example were prepared by sewing under the following conditions.

(1) Base fabric for airbag . . . two circular fabrics (700 mmφ) cut out from an uncoated, plain-woven fabric (warp: 59/inch, weft: 59/inch) by 350 dtex nylon 66 multiple wound yarn.

(2) Sewing thread . . . yarns for the upper thread and lower thread described below, were respectively subjected to a dipping treatment with a silicone-based oleum for Comparative Example, and with an ester-based oleum (monohydric alcohol higher fatty acid ester series) for the Example, and these yarns were respectively used for the upper thread and lower thread. Tensions at times when the upper thread and the lower thread were pulled out were respectively 300 gf and 200 gf.

Yarn for the upper thread: 1400 dtex (1260d) nylon 66 filament multiple wound yarn (twisting number 170±30/m)

Yarn for lower thread: 940 dtex (840d) nylon 66 filament multiple wound yarn (twisting number 170±30/m)

(3) Sewing . . . Outer periphery (25 mm inner side) of the base fabrics were sewn up by multi-thread chain stitch (chain stitch: sewing pitch 2.5-3 mm) as shown in FIG. 1, on a high speed automatic sewing machine manufactured by Juki Co., Ltd, single needle (ORGAN needle DP17-24 count). The sewing speed was 3000 rpm (min$^{-1}$).

About 10 days later, rectangular test pieces (width 50 mm×length 300 mm) were cut out from the samples prepared in the above manner, and slippage resistance values were measured at the sewn regions and general regions (40 mm inner side from the sewn region) according to ASTM D6749-2.

Figure 2:
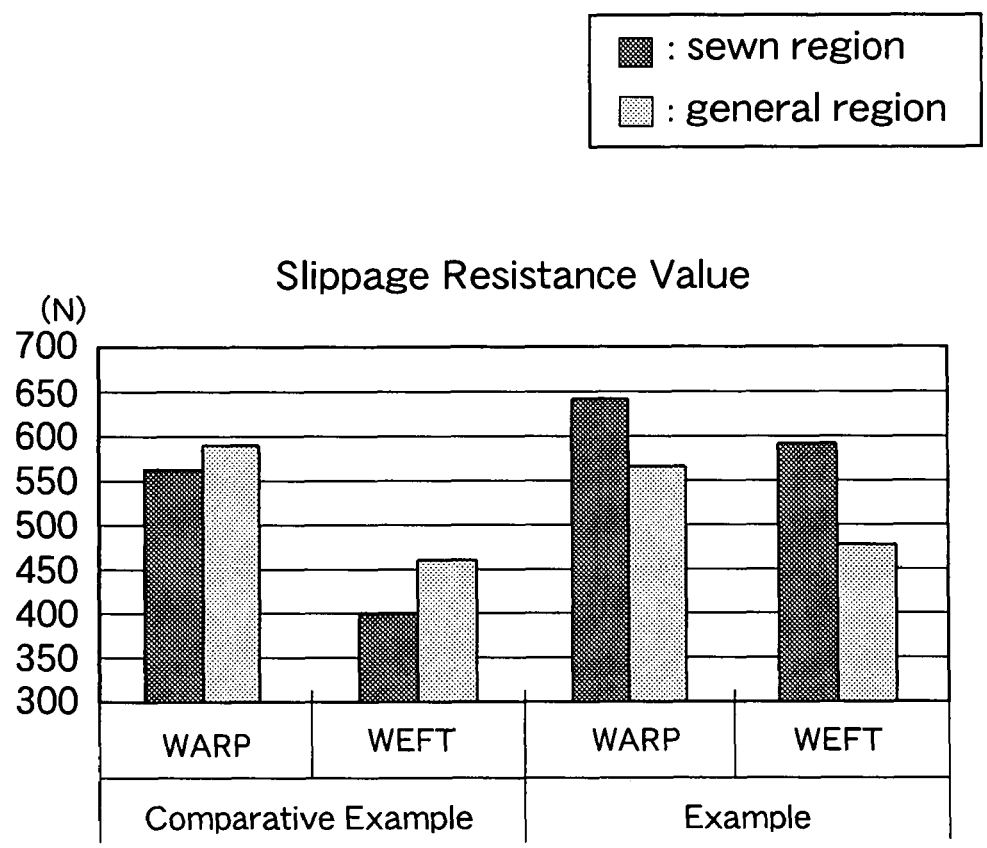
FIG. 2 is a bar graph showing the result of the test conducted on the text examples.

According to the test results shown in Table 1 and FIG. 2, little difference is observed in the slippage resistance values in the general or inner regions which are hardly affected by the olea, whereas, in the values in the peripheral sewn regions, Comparative Example (silicone-based oleum) shows a significantly low value, particularly in the weft, in comparison with the Example of the present invention (ester-based oleum). It is proved that the weave slippage is less likely to occur in Example than Comparative Example, and that Example according to the present invention is superior in preventing gas leakage from the sewn region and its vicinity upon airbag deployment i.e., has improved air-tightness.

TABLE 1

|  | Treating agent | Sewn part | | General part |
|---|---|---|---|---|
| Comparative Example | Silicone-based oleum | Warp | 561N | 587N |
| | | Weft | 398N | 454N |
| Example | Ester-based oleum | Warp | 640N | 563N |
| | | Weft | 590N | 477N |

What is claimed is:

1. An airbag manufactured by sewing a base fabric with a sewing thread, the base fabric being woven with a first polar fiber, the sewing thread being made up of a yarn formed from a second polar fiber, wherein;

the yarn is subjected to a lubrication treatment using a lubricating agent that consists of a polar group-containing compound having an action to improve lubricity of the sewing thread or that contains mainly said polar group-containing compound, the polar group-containing compound is one or more kinds selected from the group consisting of ester series, higher fatty acid series, higher alcohol series, amine series, metal soap, oxidized PE wax and acid-modified PE wax.

2. The airbag according to claim 1 wherein each of the first polar fiber and the second polar fiber is a polyamide fiber, a polyester fiber, or a vinylon fiber.

3. The airbag according to claim 1, wherein the lubricating agent on the yarn of the sewing thread is not permeated into the base fabric.

4. A sewing thread used to sew up a base fabric woven with a first polar fiber into an airbag, the thread being made up of a yarn formed from a second polar fiber, wherein the yarn is subjected to a lubrication treatment using a lubricating agent that consists of a polar group-containing compound having an action to improve lubricity of the sewing thread or that contains mainly said polar group-containing compound, the polar group-containing compound is one or more kinds selected from the group consisting of ester series, higher fatty acid series, higher alcohol series, amine series, metal soaps, oxidized PE wax and acid-modified PE wax.

5. The sewing thread according to claim 4 wherein each of the first polar fiber and the second polar fiber is a polyamide fiber, a polyester fiber, or a vinylon fiber.

6. The sewing thread according to claim 4, wherein the lubricating agent on the yarn does not permeate into the base fabric.

* * * * *